United States Patent [19]

Evans et al.

[11] Patent Number: 4,565,441

[45] Date of Patent: Jan. 21, 1986

[54] LIGHT SOURCE FOR PHOTOGRAPHIC COLOR PRINTERS

[75] Inventors: William C. Evans, Rochester, N.Y.; Haven D. Noble, Mt. Pleasant, Iowa

[73] Assignee: Viva-Tech, Inc., Rochester, N.Y.

[21] Appl. No.: 695,105

[22] Filed: Jan. 25, 1985

[51] Int. Cl.$^4$ .............................................. G03B 27/72
[52] U.S. Cl. ........................................ 355/37; 355/38; 355/69
[58] Field of Search ..................... 355/32, 35, 37, 38, 355/68, 69, 77; 323/300, 239; 307/491

[56] References Cited

U.S. PATENT DOCUMENTS

| | | | |
|---|---|---|---|
| 3,630,609 | 12/1971 | Clapp et al. | 355/37 |
| 4,093,908 | 6/1978 | Evans | 323/300 |
| 4,124,292 | 11/1978 | Van Wandelen | 355/37 |
| 4,371,259 | 2/1983 | Howitt | 355/38 |

OTHER PUBLICATIONS

Brochure: Hazeltine Additive Light Source for Finishing Printers–Hazeltine Corp. Greenlawn, NY. (no date given).

Primary Examiner—L. T. Hix
Assistant Examiner—Della J. Rutledge
Attorney, Agent, or Firm—M. LuKacher

[57] ABSTRACT

A light source for providing controllable illumination having the red, green, and blue components in selected intensity proportion, uses a lamp/filter assembly which projects light through a diffusing plate into a mixing chamber from the output end of which mixed light is emitted for illuminating photographic paper through a negative. The chamber is rectilinear, and the red and green lamps project toward opposite corners while the blue lamp projects along the axis of the chamber. A light pipe which has an input end facing the output end of the chamber extends into the chamber and extracts light which is processed in red, green, and blue channels having temperature stabilized phototransducer circuitry and control circuitry wherein signals corresponding to the intensity of the color components are processed in the channels and are modified by control signals which can be produced in the photo printer control computer. The control signals, as they may be modified, are compared in each channel with a time-variant, repetitive waveform synchronized to the AC line, which varies in accordance with an anti-log function and which provides control pulses. The control pulses are applied to switching circuitry which controls the power to each lamp. This circuitry thereby compensates for the nonlinearity in the transfer characteristic of the system. The illumination of the photographic paper is therefore accurately controlled.

13 Claims, 21 Drawing Figures

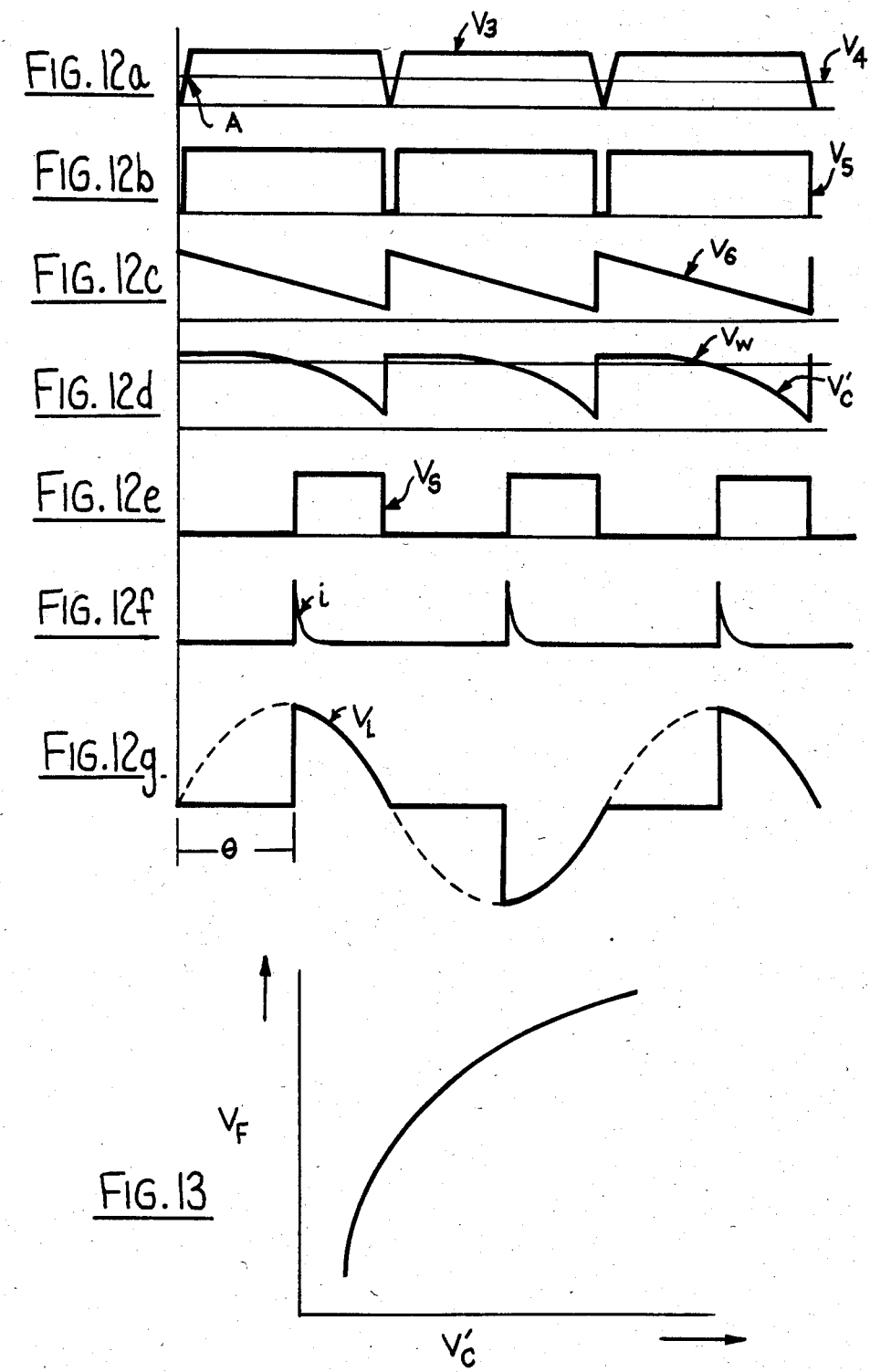

LIGHT SOURCE FOR PHOTOGRAPHIC COLOR PRINTERS

DESCRIPTION

This invention relates to a light source for photographic color printing and, more particularly, to a high-intensity additive light source for photographic color printing.

It is well known that it is necessary to make color corrections during the photographic printing process in order to insure that the final print when viewed is representative of the original subject photographed. This correction process involves adjusting the exposure of each of the three primary colors (red, green, and blue) by one means or another during the printing process. This may be done by adjusting the exposure time for each primary color, the intensity of each primary color, or a combination of the two. Various instruments for determining the amount of correction required for various negatives are presently available; for example, video negative analyzers and densitometers. These instruments most commonly express the correction required in units of density.

The light source, therefore, must convert these previously determined corrections for each negative so as to produce the proper exposure for each of the three primary colors so that the desired final print is produced. Since negatives quite commonly exhibit rather large variations in color densities, it is therefore extremely important that the light source be capable of accurately translating the analyzer corrections into the proper primary exposures, even over a wide range of negative densities. For example, it should be capable of introducing the proper corrections even for badly overexposed or underexposed negatives. Obviously, it is also important that the light source remain accurate over a long period of time to prevent unwanted color shifts in final prints.

Presently, many production photographic color printers employ light sources which operate on a variable exposure-time principle. A white light source is employed, and corrections are introduced by swinging subtractive (cyan, magenta, and yellow) filters into the light path to terminate the exposure of each of the three primary colors. These light sources exhibit high light output which results in short exposure times, a factor which is of primary importance in production color printing. They also exhibit good evenness of illumination which is important for high quality prints. However, they suffer from several disadvantages, the most significant being the need for slope control circuits. It is well known that color shifts result whenever exposure time is varied to compensate for negative density variations. If, for example, the light intensity is reduced by a factor of two and the exposure time is doubled, then a noticeable color shift can be observed when viewing two prints made under these two conditions. Furthermore, the degree of shlift may be different for different photographic papers. Slope control circuits attempt to compensate for this effect; however, they are very complex, very expensive, and prone to drift. They also are imperfect since the degree of slope compensation is a function of the photographic paper being used. Another disadvantage of light sources that use a variable exposure time is that the filters must be mechanically placed in the light path, and they are therefore prone to failure. Also for short exposure times, variations in the rate of travel into the light path can cause unwanted color shifts as well.

Another type of light source used for photographic color printing also employs a white light source. Subtractive filters are placed partially in the light path to vary the intensity of the three primary colors, and the light beam is then directed into a mixing chamber to improve evenness of illumination at the negative stage. These sources eliminate the need for slope compensation, but generally have been relegated to applications where the filters are adjusted manually. The mechanisms for inserting the filters in the light path most commonly employ nonlinear cams and a multiplicity of gears, and attempts to motorized these have generally resulted in designs which are both expensive and unreliable.

In additive light sources, light of the three primary colors is generated using a multiplicity of white light lamps. Associated with each lamp is a fixed filter corresponding to one of the three primary colors. The red, green, and blue light thus generated is directed into a mixing chamber where it is thoroughly mixed to provide the required evenness of illumination at the negative. Corrections are introduced by varying the voltage on the lamps, which in turn varies the intensity of the red, green, and blue light passing through the negatives.

Unlike the above two types of light sources, additive light sources contain no moving parts. This not only immensely improves their reliability, but also eliminates mechanical vibration which can cause reduced bulb life or fuzzy prints. Additive light sources use a fixed exposure time since they introduce corrections by varying the intensity of the three primary colors rather than by varying the exposure time. They therefore do not require slope control circuits with their previously enumerated disadvantages.

Previous additive light sources have had numerous disadvantages, however, which have made them even less attractive then subtractive light sources for production color printing, the most notable being low light output and/or poor evenness of illumination. Reference may be had to U.S. Pat. Nos. 3,630,609, Clapp et al, Dec. 28, 1971; 4,124,292, Van Wandelen, Nov. 7, 1978 and Hazeltine Corp., Greenlawn, N.Y., U.S.A.—Additive Light Source for Finishing Printers, for further information as to previous additive light sources. The process of generating light of the three primary colors is inherently inefficient since only one primary color is generated by a lamp or group of lamps. Additive light sources require more mixing than subtractive sources since the light entering the mixing chamber has already been separated into the three primary components. Incomplete mixing results in uneven illumination both with regard to overall intensity and, perhaps more important, with regard to color, which is easily detected in the final print. Unfortunately, most efforts to improve evenness of illumination often significantly reduce the light output of the light source.

Heretofore, additive light sources have also exhibited poor stability and repeatability which have either caused unwanted color shifts in the final prints or have required frequent readjustment of the light source. Some additive lamp sources have used reostats or autotransformers to vary the lamp voltages and have employed no light feedback. In these light sources, the relationship between the input setting and the light output varies as a function of filter aging, lamp aging or replacement, and the buildup of dust in the internal components such as filters, diffusers, or mixing chambers. Other additive lamp sources which employ light feedback often exhibit poor stability because of photocell drift or lack of tracking between the light feedback and the light output.

Another disadvantage of some additive light sources is their inability to rapidly set up corrections for each new negative. Unlike variable exposure-time light sources, the new lamp voltages necessary to produce the required negative correction must be set up prior to the initiation of the exposure cycle. Thus, it is important that this phase take as little time as possible. Unfortunately, some additive light sources do not respond rapidly to input changes, and exhibit damped oscillations when new corrections are introduced.

At the present, many photographic processing plants extensively employ digital computers for such functions as order entry, production scheduling and control, and process monitoring. Yet, generally speaking, the inputting of data to the light source has remained a manual operation whereby analyzer data is physically carried to the photographic printer and then manually entered. It is evident that many benefits could be realized by directly interfacing the light source with a digital computer system. For example, analyzer data could be transmitted in electrical form directly to the photographic printer, and corrections could be automatically set up for each negative being printed; or corrections determined as a result of process monitoring could automatically be fed to each photographic printer to correct for variables in the process. Unfortunately, however, most of the aforementioned light sources cannot be easily or inexpensively interfaced with digital computers which limits their usefulness in this application.

It is the object of this invention to provide an improved additive light source for photographic color printing wherein the drawbacks and disadvantages discussed above are substantially eliminated.

Another object of this invention is to provide an improved light source which has simultaneously high light output and good evenness of illumination, yet has no moving parts and is simple in design and inexpensive.

A further object of this invention is to provide an improved light source which has a simple, predetermined relationship between the electrical input and the light output, and further which can be easily and inexpensively interfaced with digital computer systems.

A still further object of this invention is to provide an improved light source which is highly stable and repeatable over long periods of time.

A still further object of this invention is to provide an improved light source which can respond rapidly to input signal changes.

Briefly described, an improved additive light source embodying the invention makes use of a rectilinear mixing chamber having a diffusing light-transmitting member at its input end to which an arrangement of lamps and filters projects primary colored light into the corners and center of the chamber for mixing. The photographic medium to be exposed is at the outlet of the chamber. A pick-up light pipe in the chamber transmits the light, but is aimed to pick up the mixed light at the output of the chamber. The picked-up light is process by circuitry which detects variations in its primary color components in accordance with predetermined intensity functions to provide error signals. These error signals are combined with control signals, which can be derived from conventional color printing processor control computers, to control the current to and the intensity of the light from the lamps.

Figure 8B:
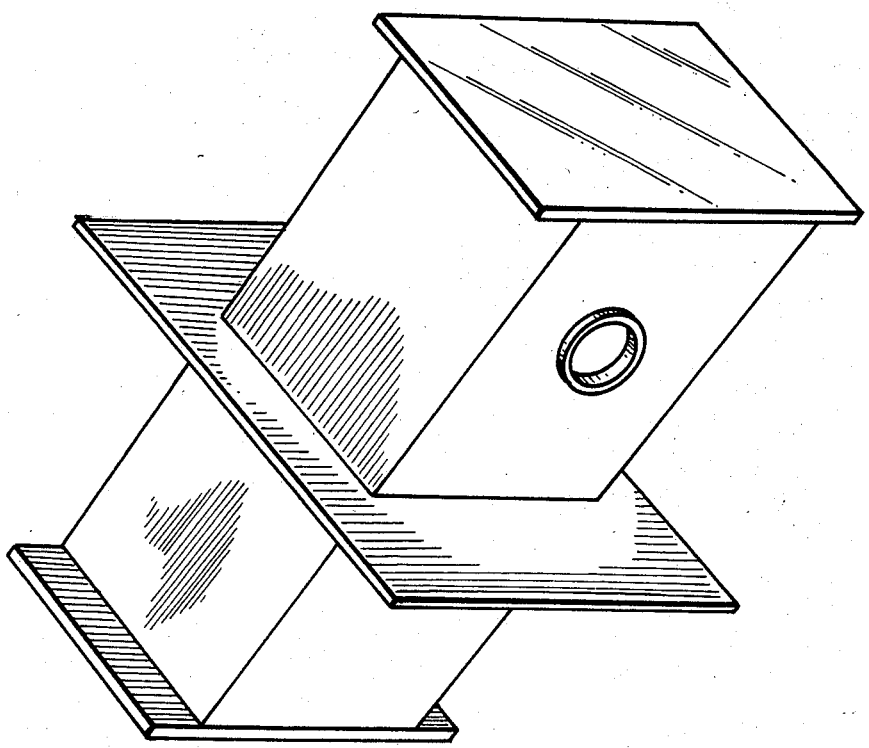
Figure 8A:
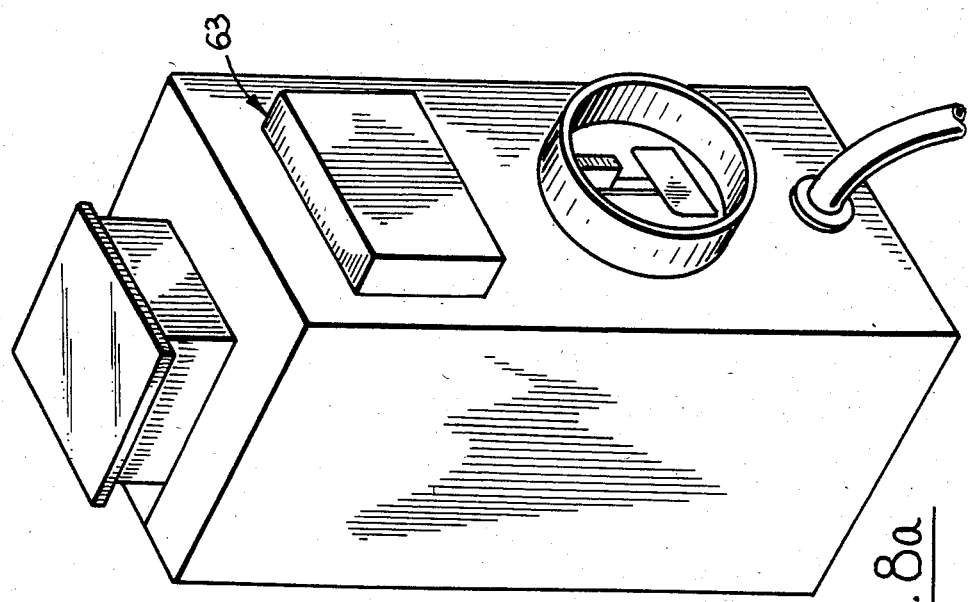
Figure 9:
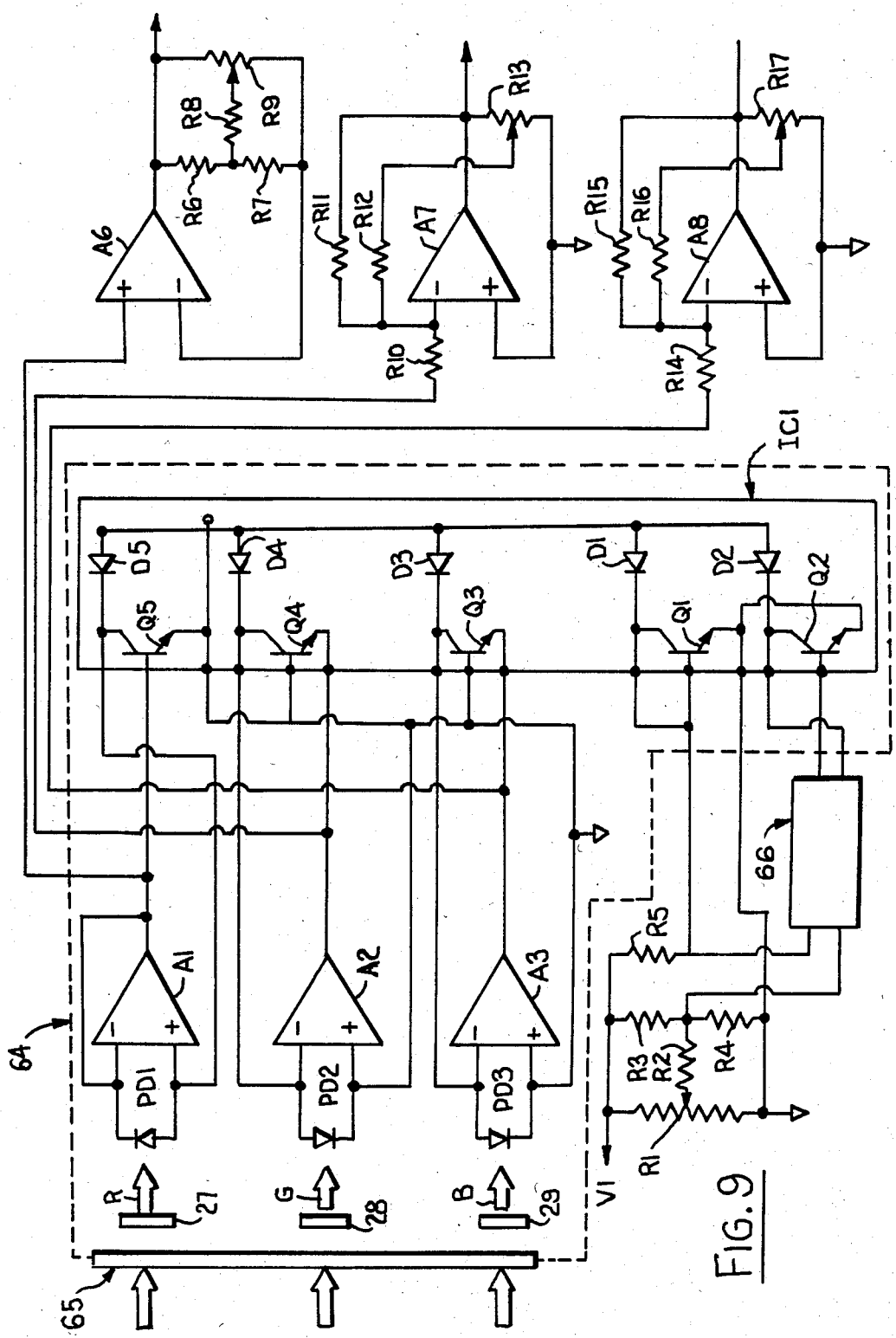
Figure 10:
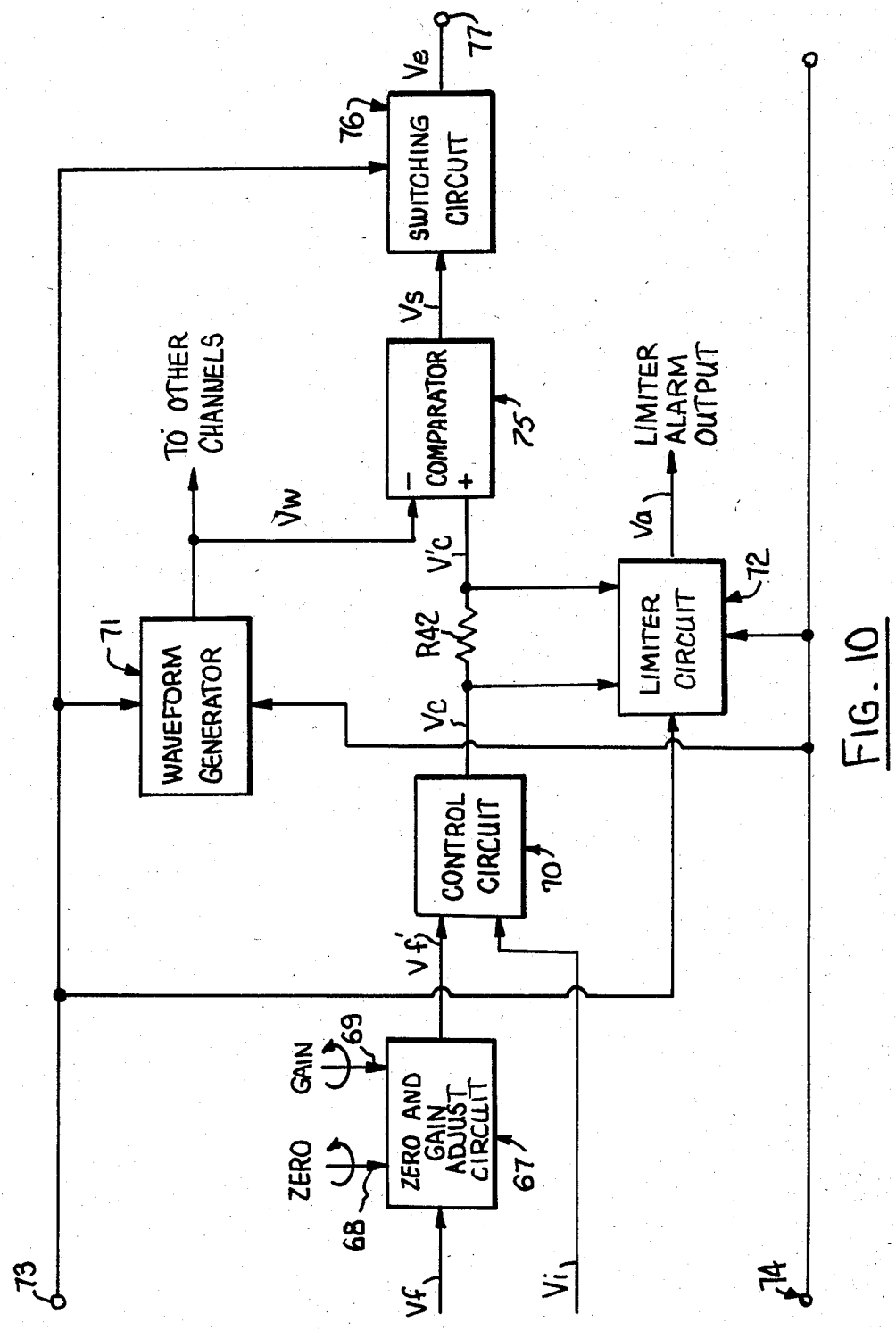
Figure 11:
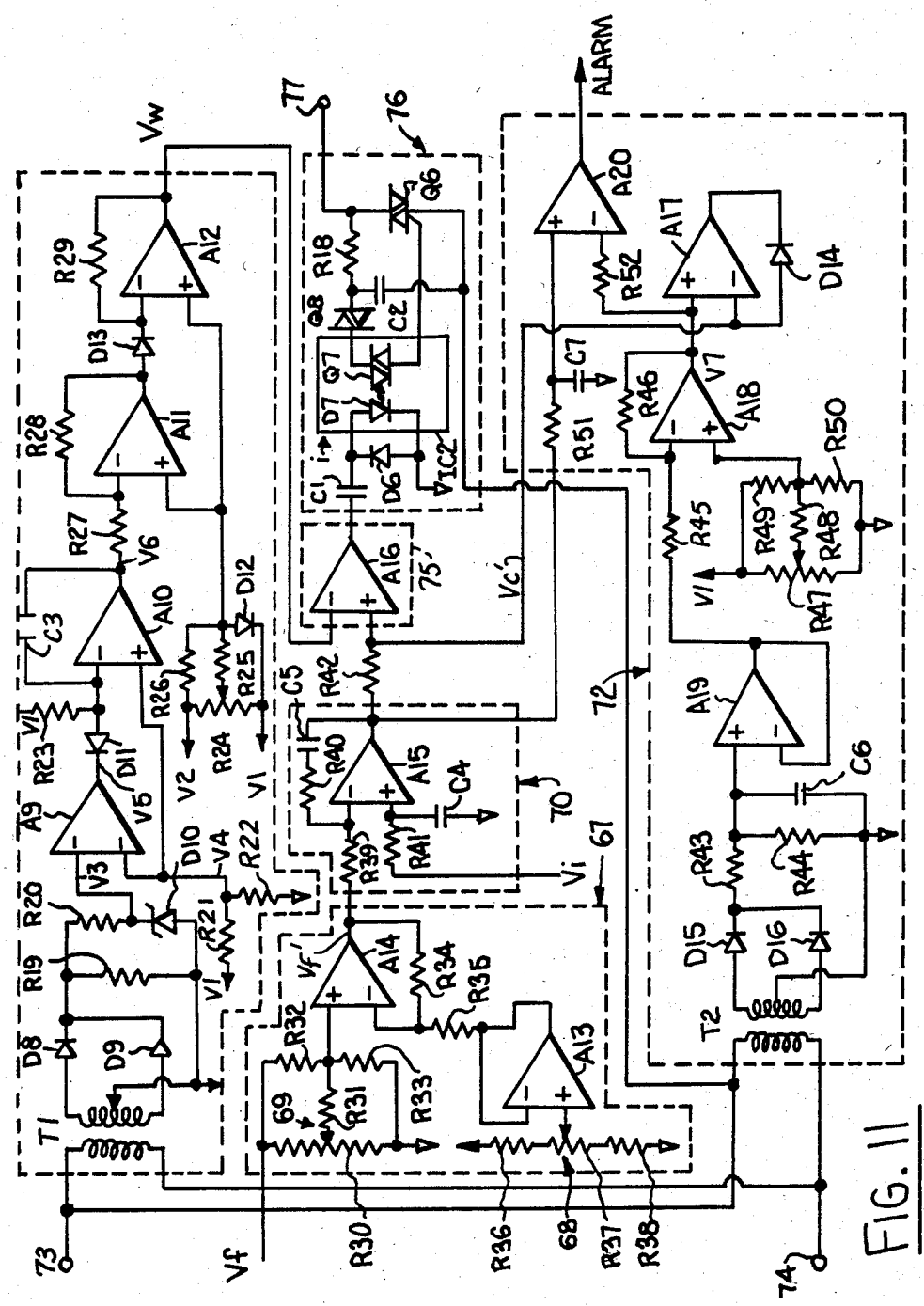

FIGS. 8A, B, and C are perspective, pictorial views, respectively of the rear of the lamphouse, the lamp-mixing module, and the lamp/filter assembly;

FIG. 9 is a schematic diagram of a portion of the phototransducer circuitry;

FIG. 10 is a block diagram of a portion of the electronics control unit;

FIG. 11 is a schematic diagram of a portion of the circuitry in the electronic control unit;

FIG. 12 are timing diagrams illustrating various waveforms in the circuitry of FIG. 11; and FIG. 13 is a diagram showing the nonlinear gain characteristic which results when the waveform generator in the control unit generates a linear ramp.

Figure 1:
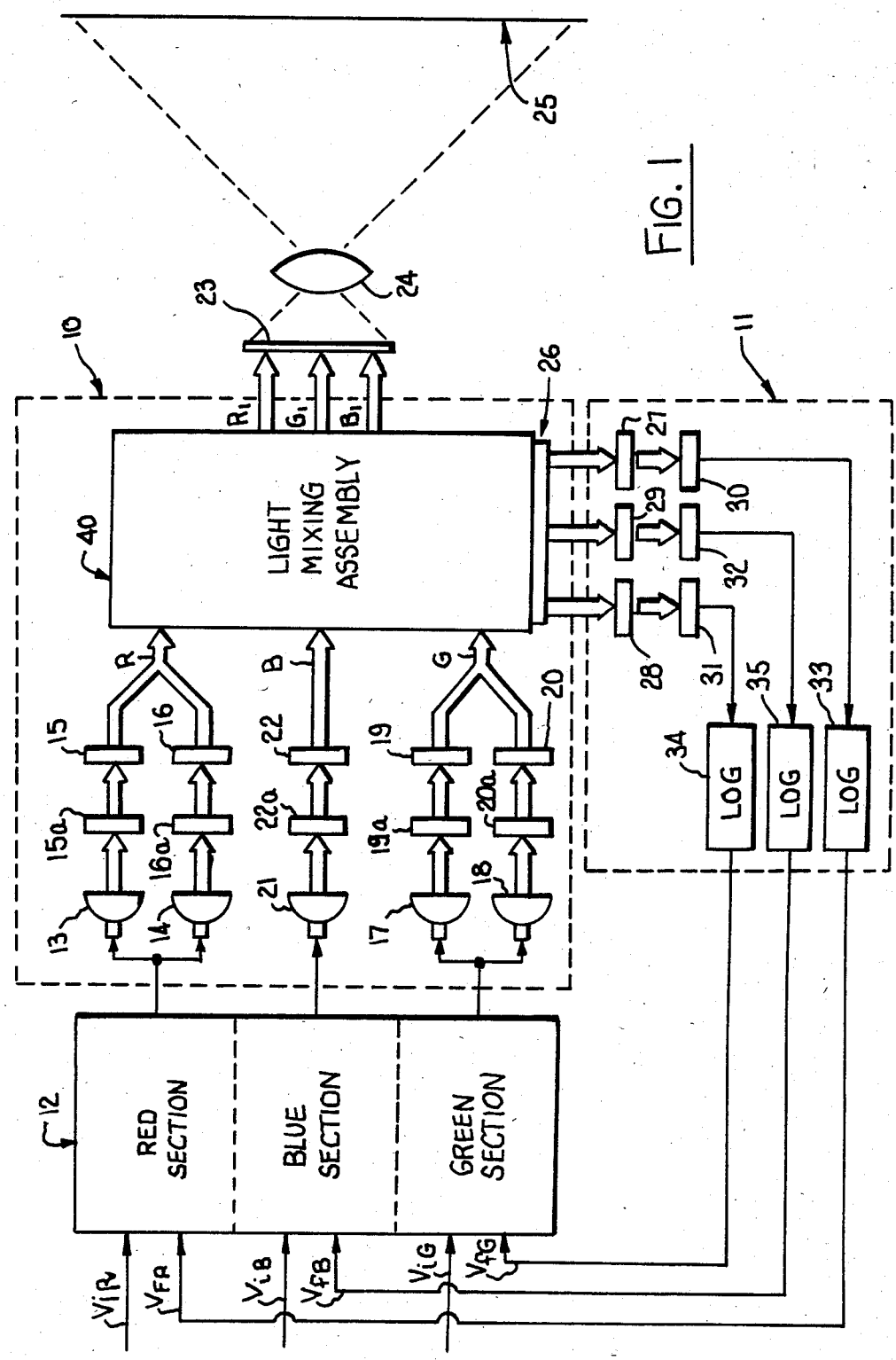
FIG. 1 is a schematic diagram of the light source according to an embodiment of the invention, showing its optical and electrical system.
Figure 2:
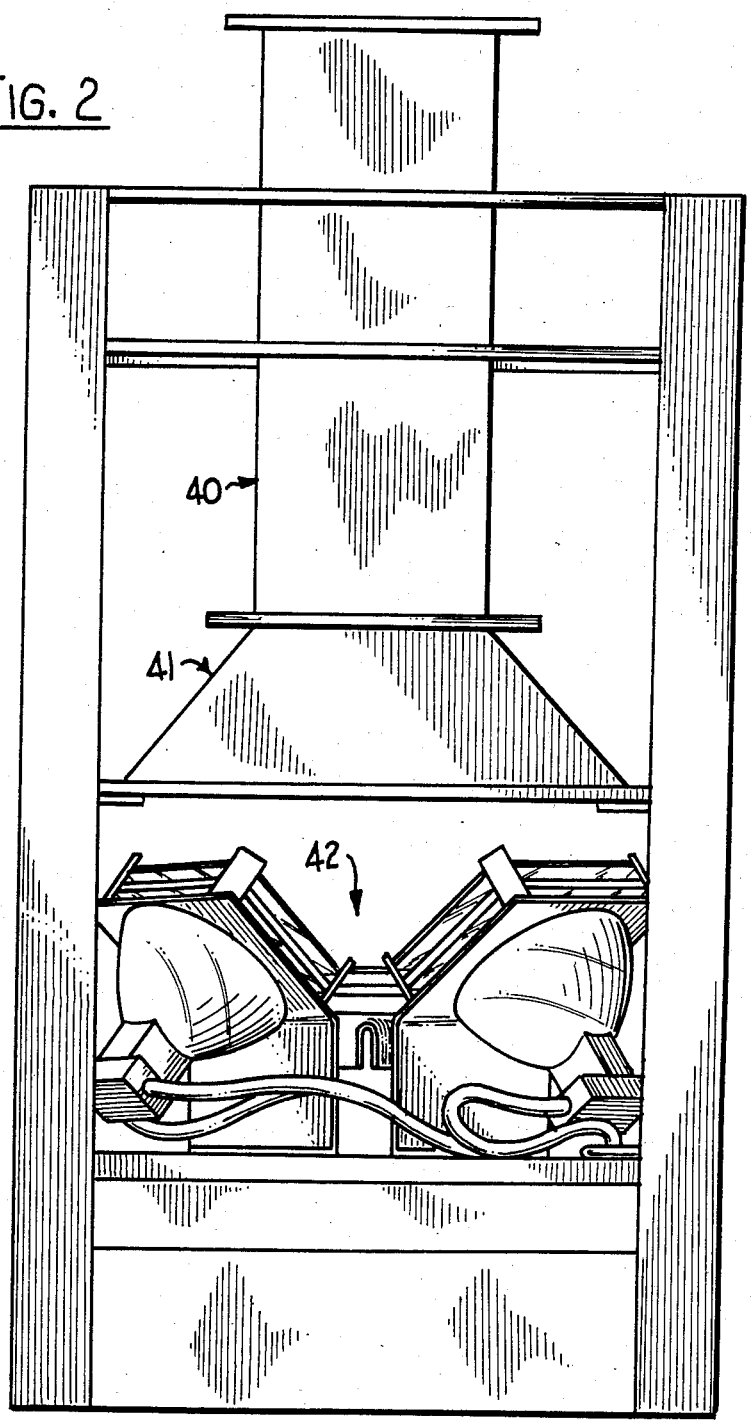
FIG. 2 is a pictorial, front view of the lamphouse of the source with the cover removed.
Figure 3:
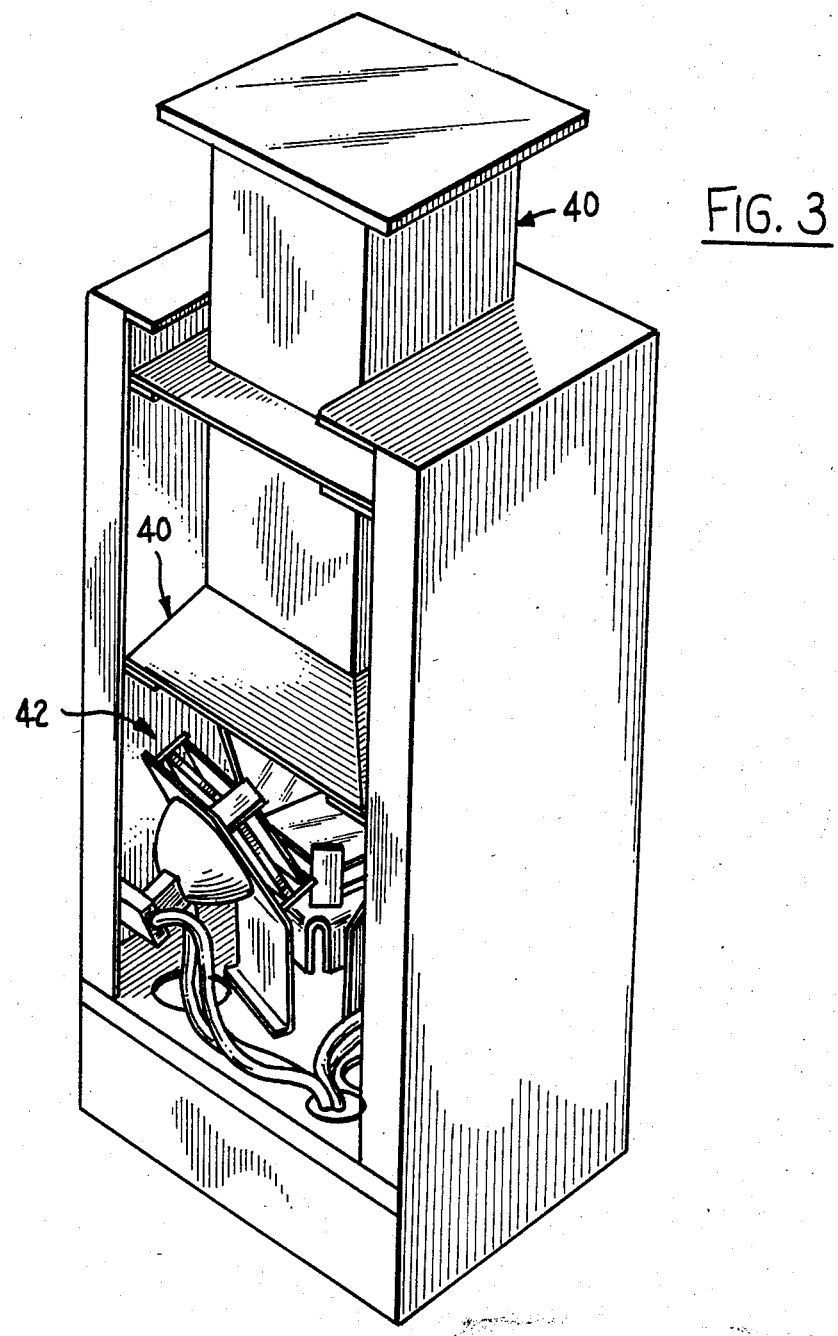
FIG. 3 is a pictorial view of the lamphouse from the front with the cover removed and shown from a different angle than in FIG. 2.

Referring to FIG. 1, the light source has a lamphouse 10, a phototransducer 11, and an electronic control unit 12. The lamphouse is additive in nature, and contains a total of five white lamps and associated primary filters for generating light of the three primary colors. Two lamps 13 and 14 and two red filters 15 and 16 are used for generating red light; two lamps 17 and 18 and two green filters 19 and 20 for generating green light; and one lamp 21 and blue filter 22 for generating blue light. Infrared rejecting filters 15a, 16a, 19a, 20a, and 22a are also placed in front of each lamp to reduce heat in the light-mixing assembly and at the negative, and to prevent unwanted infrared from falling on the printing material. Light of the three primary colors is then directed into a light-mixing assembly 40 where it is thoroughly mixed. Light is emitted from the opposite end of the light-mixing assembly where it passes through a negative 23 and is focused by an optical system represented by lens 24 onto the printing material 25.

A portion of the light in the light-mixing assembly is transmitted via light pipe 26 to the phototransducer 11. The phototransducer separates the light transmitted from the light mixing assembly into its three primary components, measures the amount of each component, and extracts the log of each, producing for each primary color an electrical output signal which is the log of the input light intensity. Light transmitted through the light pipe passes through red, green, and blue filters designated as 27, 28, and 29 respectively, and is directed to photodiodes 30, 31, and 32, each of which produces a current output which is proportional to the input light intensity. Outputs from the three photodiodes are fed to three log amplifiers 33, 34, and 35, each of which produces an output voltage which is proportional to the log of the input current. The three feedback signals are next fed into the electronic controller 12 whereby they are compared with input control signals corresponding to the three primary colors. The electronic controller then generates the proper lamp voltages to produce light outputs from the lamphouse which are representative of the input color signals on each of the respective primary channels.

In effect, the light source consists of three separate feedback control loops, each of which controls the intensity of light of one of the three primary colors being emitted from the lamphouse. As will be explained later, the lamphouse is designed so that the red, green, and blue light being fed to the photodiodes is proportional to the intensity of red, green, and blue light being emitted from the lamphouse and passing through the negative.

The light source can be calibrated directly in density units such that input signals corresponding to the measured densities of the particular negative can be fed into the light source, and the proper light intensity in each of the primary colors to effect perfect compensation will be automatically set up. If, for example, the light source is set to provide the correct compensation for a given negative, and then another negative with different density measurements is next inserted in the negative stage, it is necessary only to feed the new density readings into the light source as electrical input signals in order to effect perfect compensation. It will also be appreciated that even though the densities vary from one negative to another, the amount of red, green, and blue light falling on the photographic paper will remain constant, and therefore the exposure time required will also remain constant.

Since the input signals to the light source are analog electrical signals and since these signals correspond to conventional density units, the light source can be easily and inexpensively interfaced with digital computer systems by adding conventional digital-to-analog converters to each of the three input channels. Or alternatively, simple circuitry employing calibrated linear potentiometers supplied from a stable source of DC voltage can be used to input data manually to the light source.

Figure 4:
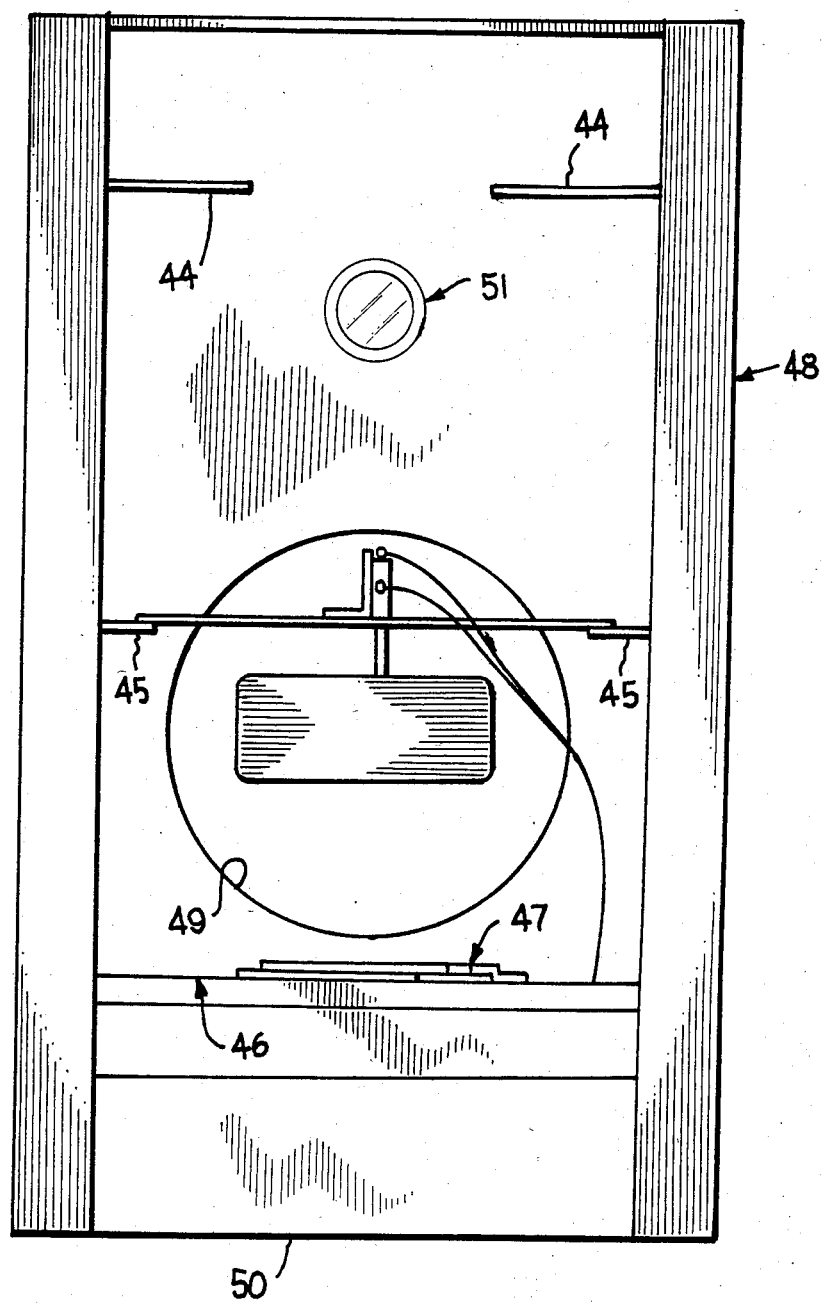
FIG. 4 is a pictorial, front view of the lamphouse with the cover removed and with the internal components removed.

As shown in FIGS. 2 through 8, the lamphouse includes a light-mixing chamber 40, a reflective skirt 41, and a lamp/filter assembly 42. All three of these components are modular packages which can be easily removed from the lamphouse. As best shown in FIG. 4, the light-mixing chamber slides in on rails 44, and the reflective skirt slides in on rails 45. The lamp/filter assembly is secured to the base plate 46 of the lamphouse by means of a clamping mechanism 47. An electrical connector is also provided on the lamp/filter assembly to facilitate removal of the assembly. With this arrangement, the light-mixing module, the reflective skirt, and the lamp/filter assembly can be easily removed for cleaning or repair. In addition, components with different geometry so as to maximize the light output of the lamphouse for different size negatives can be easily substituted. The lamphouse also includes a light pipe assembly 51 which transmits light from the light-mixing module to the outside of the lamphouse enclosure.

The sheet metal enclosure 48 serves to rigidly hold the three aforementioned components in proper mechanical alignment with respect to each other, and it also serves to properly divert and direct air flow so as to efficiently cool the lamphouse and its various internal components. A duct 49 is provided in the rear of the enclosure through which air is withdrawn by an external blower coupled to the duct via a flexible hose. Air enters through the bottom of the lamphouse 50 and passes through an air filter. The base plate 46 is provided with a series of holes, each one of which is associated with one of the lamps in the lamp/filter assembly. These holes are oriented such that air is directed toward the base of each of the lamps prior to being withdrawn via duct 49. This arrangement provides for extremely efficient cooling of the lamps and filters, and permits the use of relatively high-wattage lamps without resorting to a high capacity blower.

Figure 5:
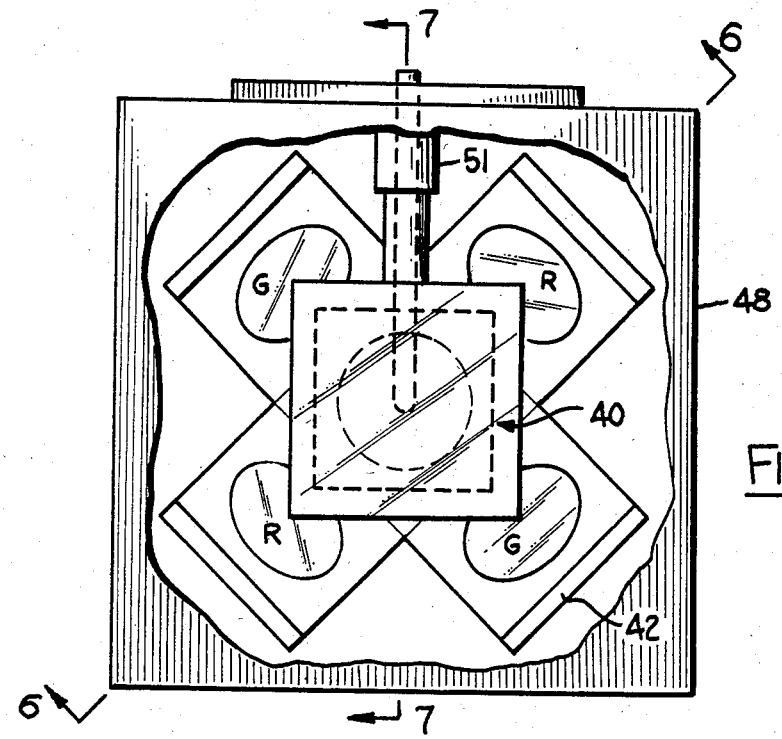
FIG. 5 is a simplified, schematic view of the lamphouse from the top with the reflective skirt removed.

As shown best in FIGS. 5 and 6, five high-intensity, halogen-type lamps (13, 14, 17, 18, and 21) with integral reflectors are mounted below the light-mixing module. The integral reflector of each lamp is such that it directs the light in a fairly narrow beam. The light from each of the five lamps is thus directed through an infrared rejecting filter, a primary filter, and into the light-mixing module. The lamp and filter for the blue channel are located on the optical axis of the integrating chamber. The lamps and filters for the red channel and the green channel, however, are located slightly off the optical axis in the orientation shown near the four corners of the light-mixing module, and are arranged so that the two red lamps are near opposite corners of the light-mixing modules as are the two green lamps.

Figure 6:
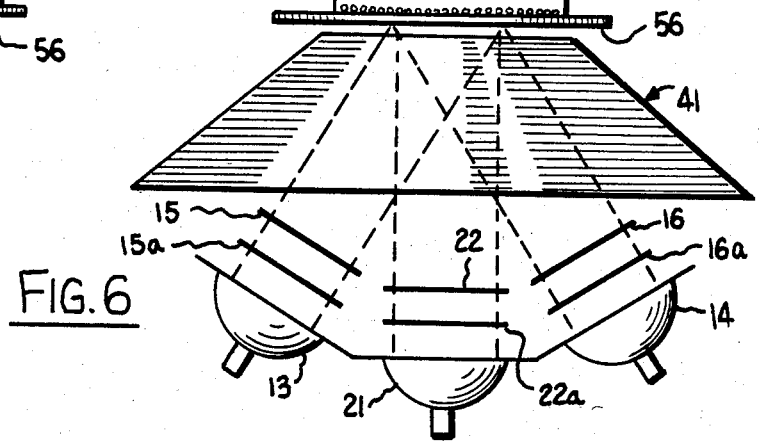
FIG. 6 is a simplified, schematic sectional view taken along lines 6—6 in FIG. 5, but with the reflective skirt included.

FIG. 6 shows a diagonal, cross-sectional view of the light-mixing module, the lamps and filters with the reflective skirt now included. This view shows only the two sets of lamps and filters associated with the red channel and the one set associated with the blue channel. Another diagonal cross-section taken by rotating 90 degrees about the optical axis of the light-mixing module would be identical to this except that the two red filters would be replaced with two green ones. As shown, the blue lamp 21 is mounted on the optical axis of the light-mixing module so that its beam is directed along this axis. The two red lamps 13 and 14 are mounted slightly off of the optical axis and are positioned so that their beams pass through the lower diffuser 56 and are directed into the corners of the rectilinear mixing chamber 57. The two green lamps are arranged in like fashion with their beams being directed into the two remaining corners of the mixng chamber at the same angle as shown for the two red lamps. Thus, the beams of all five lamps intersect at or near a point located on the lower diffuser 56 as shown. This particular positioning and alignment of the lamps and filters creates a large uniform area of light over the central area of the lower diffuser 56, where it is scattered and directed upward through the mixing chamber, and finally passes through the upper diffuser 58 at the other end of the mixing chamber. The reflective skirt 41, whose internal surfaces are specular and highly polished, collects stray light from the lamps and filters and diverts it into the light-mixing module, thereby further increasing the efficiency of the lamphouse.

Figure 7:
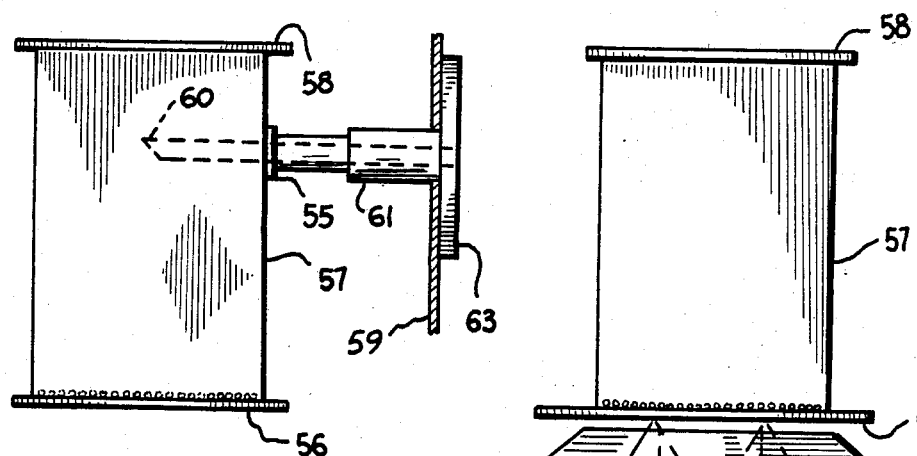
FIG. 7 is a simplified, schematic sectional view taken along lines 7—7 in FIG. 5, showing only the light-mixing module and the light pipe assembly.

The light-mixing module and the light pipe assembly are shown in more detail in FIG. 7. The light-mixing module has a rectilinear, cross-sectional area which is square, a length-to-width ratio of approximately 2.5 to 1, and has internal surfaces which are specular and highly polished so as to efficiently reflect light. One end (the outlet) of the mixing chamber is covered with the upper diffuser 58 which is made of conventional light-dispersing material with a fine-grained structure such as ground glass or white transluscent plastic. The other (inlet) end of the chamber is covered with a light-dispersing screen 56 which very efficiently disperses light without significantly reducing its intensity. The light-dispersing screen consists of small glass spheres, for example 0.1" in diameter or less, which are deposited in a single uniform layer on a transparent substrate. Unlike other dispersing means, glass spheres have the ability to disperse or scatter light at wide angles with great efficiency. As was shown previously, the light-mixing module is oriented in the lamphouse such that the lower diffuser 56 is oriented toward the lamp/filter assembly while the upper diffuser 58 is oriented toward the negative. Light from the lamp/filter assembly is thus directed toward the lower diffuser where it is very efficiently dispersed, and passes up through the mixing chamber where it is further mixed by the highly reflective internal surfaces of the chamber, and finally it is further diffused by the upper diffuser 58. It has been found that this arrangement of lamps, filters, and various light-scattering devices very efficiently scatters and mixes light from the three primary colors, thereby producing superior evenness of illumination and color at the upper diffusion plate with very little loss of light.

The light pipe assembly is also shown in detail in FIG. 7. The back wall of the mixing chamber 57 is provided with a hole through which the light pipe passes when the light-mixing module is inserted into the lamphouse. The light pipe assembly is attached to the rear of the enclosure 59 and holds the light pipe 60 in a rigid position. The light pipe assembly also contains a spring-loaded retractible shield 61 which covers that portion of the light pipe between the light-mixing module and the rear of the lamphouse enclosure 59, thus preventing stray light from outside the light-mixing module from entering the light pipe. When a light-mixing module is inserted, a portion of the light shield retracts so as to exactly cover that portion of the light pipe between the mixing chamber and the rear of the lamphouse enclosure. The light pipe assembly will therefore accommodate light-mixing modules of various sizes while still providing the necessary light shielding. A felt washer 55 is placed around the hole in the mixing chamber so as to provide a good light seal at this point.

As was previously mentioned, it is desirable that the relationship between the three primary components of output light from the light source and their respective input signals remain constant and repeatable, and further that this relationship not be affected by bulb aging, filter aging, or bulb replacement. These effects can be minimized by insuring that the light which is transmitted to the photosensors is accurately representative of the output light of the light source. If this is the case, then all of these aforementioned effects will be eliminated by the feedback control loops. For example, if the light output of a red lamp should decrease so as to decrease the red output light, the feedback system will increase the lamp voltage on the red channel to correct for this.

As was mentioned previously, the upper diffuser 58 is made of a fine-grained material which scatters and diffuses light. It has been found that the light scattered or reflected downward from the upper diffuser plate and the upper portion of the mixing chamber is accurately representative of the output light from the light source which passes through the negative. It has further been found that this light can be easily and inexpensively diverted into the light pipe by beveling the end of the light pipe located inside the mixing chamber so that it will act as a mirror. Thus, light which is reflected downward from the upper diffuser and the upper portions of the mixing chamber is reflected into the light pipe where it is transmitted to the phototransducer. On the other hand, since the light pipe is made of optically transparent material such as acrylic or glass, it does not impede light rays traveling upward through the mixing chamber and therefore does not produce any unevenness of illumination at the upper diffuser. The light pipe further is oriented so that the center of the beveled portion is located on the optical axis of the light-mixing module, and is located a sufficient distance downward from the upper diffuser 58 so that the sensor is afforded a good field of view. With this arrangement, the same light pipe can accommodate various light-mixing modules of different sizes while still maintaining the previously enumerated desirable features. While this arrangement is preferred because of its low cost and simplicity, it is evident that other arrangements employing the same principle could also be used. For example, the end of the light pipe could be contoured in various ways, or the light pipe could be repositioned so as to change the field of view of the light pipe and thereby achieve even greater benefits.

Even though precautions have been taken to limit the amount of dust deposited on internal components of the light source by filtering the incoming air, some dust will collect over a period of time anyway. Dust deposited on most internal components such as lamps, filters, light-dispersing surfaces, and light-reflective surfaces will not affect the relationship between the three primary components of the output light and their respective input signals because of the feedback action of the three control loops. Dust deposited on the light pipe itself, however, will affect this relationship since it will reduce the amount of light reaching the phototransducer without reducing the output light of the lamphouse. It does, however, tend to affect all three primary components of the light equally since the light is further scattered as it is transmitted down the light pipe. Since all three colors tend to be affected equally, the effect on the final print as viewed is relatively small, since it is perceived as an overall density change. On the other hand if the design were such that the three primary components were affected unequally, the effect on the final print as viewed would be relatively much greater since it would be perceived as a color shift. Of course, as mentioned previously, the design is such that the light-mixing module can easily be removed so that the light pipe can be cleaned to avoid adverse effects.

Figure 8C:
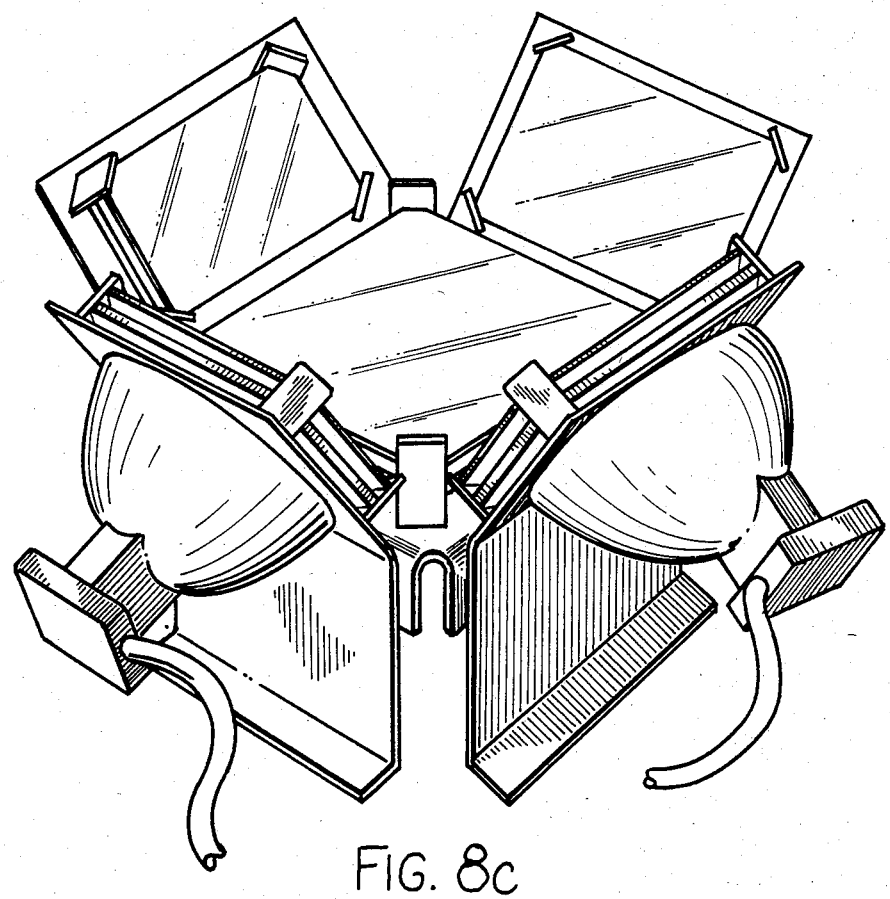

The phototransducer 11 (FIG. 1) is attached to the rear of the lamphouse, and mounts on insulator 63 which is shown in FIGS. 7 and 8. Insulator 63 prevents the conduction of heat from the lamphouse to the phototransducer. A portion of the phototransducer is shown schematically in FIG. 9. Filters, photodiodes, and log-converting circuitry are susceptible to changes in ambient temperature which changes their operating characteristics, usually adversely, and must be compensated for. Accordingly, these components are mounted in a separate enclosure 64 shown in FIG. 9, the interior of which is maintained at a relatively constant temperature elevated above the ambient temperature of the light source by heating means. While the temperature in phototransducer enclosure 64 remains relatively constant, it does nevertheless change slightly as the ambient temperature around the light source changes. Therefore, to further reduce temperature effects on transistors Q3, Q4 and Q5 (see FIG. 9) they are housed in a single integrated circuit IC1 whose internal temperature is maintained constant, but elevated somewhat above the internal temperature of enclosure 64 by means which will be explained in more detail later. Thus through these means, the temperature of the junctions of transistors Q3, Q4, and Q5 will remain extremely constant even though the ambient temperature around the light source varies considerably. The enclosure also contains an optically transparent portion 65 which is mounted in juxtaposition to the end of the light pipe at the exterior of the lamphouse. Light transmitted through the light pipe passes through this transparent portion where it is separated into the three primary components by filters 27, 28, and 29. The red, green, and blue light thus produced is then direction to photodiodes PD1, PD2, and PD3 respectively. The filters and photodiodes are 120 degrees apart about the axis of the light pipe 60.

A log relationship exists between the current and the voltage in semiconductor junctions, such as those found in ordinary silicon transistors and diodes. Heretofore, logging amplifiers have been constructed whereby a transistor is inserted in the feedback loop of an operational amplifier to produce an output voltage which is proportional to the log of the input current. The logarithmic relationship between current and voltage in a transistor, however, is extremely temperature sensitive, and therefore many previous designs have required elaborate compensating circuity to reduce the overall effects of ambient temperature variations.

In the present invention, transistors are also used to produce the log function; however, the effects of ambient temperature have been eliminated by maintaining the junctions of the transistors at a constant temperature. Furthermore, the log function of the three channels are made to be nearly identical by using transistors which are very closely matched to each other. IC1 is a conventional integrated circuit, for example LM3046, which contains five transistors. The parameters of these transistors are very closely matched because of the fabrication process used in the manufacture of the integrated circuit. In order to reduce the number of external connections on the integrated circuit, it is quite common for some of the transistors to be internally connected as shown. The collectors of all transistors are connected to the substrate of the integrated circuit by internal diodes designated as D1 through D5, and the substrate is connected to the emitter of one of the transistors as shown in FIG. 9. Transistors Q1 and Q2 in combination with the various components connected externally to them form a highly accurate temperature control loop which maintains the internal temperature of integrated circuit IC1 constant to a very high degree. In this arrangement, transistor Q1 serves as a temperature sensor while transistor Q2 serves as a heater. Transistor Q1 is connected in a diode configuration and is placed in a bridge formed by potentiometer R1 and resistors R2, R3, R4, and R5 which is supplied by a highly stable DC source V1. In the bridge the voltage across transistor Q1, which is representative of the internal temperature of integrated circuit IC1, is compared to a fixed reference voltage to generate an error signal which is fed to controller 66. Controller 66 then drives transistor Q2 whose internal power dissipation heats the interior of IC1 so that the error signal is reduced to zero, thus maintaining the junction of transistor Q1 at a constant temperature. Potentiometer R1 is used to set the internal temperature of integrated circuit IC1. Since the junctions of transistors Q3, Q4, and Q5 are in close proximity to the junction of transistor Q1, and since all four junctions are coupled thermally, they also are maintained at a constant temperature.

As is characteristic of most lamphouses used for photographic printing, the intensity of red light is substantially higher than the intensities of the other two primary colors. Therefore, the current generated by photodiode PD1 is substantially higher than the currents generated by photodiodes PD2 and PD3. This, of course, makes the red channel relatively insensitive to stray leakage currents as compared to the other two channels, all other things being equal. Transistors Q3 and Q4 are connected to amplifiers A3 and A2, respectively, to produce output voltages proportional to the log of their respective input currents. This arrangement places the collectors of transistors Q3 and Q4 at circuit common potential, through the feedback action of amplifiers A3 and A2 respectively. If amplifier A1 and transistor Q5 were connected in like fashion, the emitter of transistor Q5, which is internally connected to the substrate of integrated circuit IC1, would create a potential drop across internal diodes D4 and D3 which would vary as the emitter voltage of transistor Q5 varied. This would, in turn, cause leakage currents to flow through these diodes which would introduce errors in the blue and green channels. Accordingly, amplifier A1 and transistor Q5 have been arranged, as shown, so that the emitter of transistor Q5 is tied to circuit common. Therefore, an output voltage is generated by amplifier A5 which is proportional to the log of the current generated by photodiode PD1. With this arrangement, current generated by photodiode PD1 flows through transistor Q5, while the action of amplifier A1 raises both input terminals above circuit common potential. Hence on the red channel, an increase in the light input produces a more positive-going signal at the output of amplifier A1, while on the blue and green channels, an increase in the light input produces a negative-going signal on the output of amplifiers A3 and A2. With this arrangement, a potential is created across diode D5 which creates a leakage current through it but, because the output current of photodiode PD1 is relatively large, it does not introduce any significant error in that channel.

The output of amplifier A1 is fed to amplifier A6, where it amplifies the output signal of amplifier A1 without inverting it. The outputs of amplifiers A2 and A3 are fed to amplifiers A7 and A8 respectively, where the outputs of A2 and A3 are amplified and inverted. Potentiometers R9, R13 and R17 are used as gain adjustments, so that the gain of all three channels can be set to be equal. The transfer functions of all three channels are identical in all respects. The phototransducer circuitry of this invention exhibits a high degree of accuracy over approximately 7 logarithmic decades, which eliminates the need for neutral density filters or mechanical devices to adjust the light input to each of the three channels. The phototransducer also is not adversely affected by changes in ambient temperature and exhibits stability.

A block diagram of a portion of the electronic control unit 12 (FIG. 1) that is required for controlling one of the three channels, is shown in FIG. 10. Identical elements are used for controlling the other two channels with the exception of the waveform generator which is common to all three channels. A feedback signal $V_f$ from the phototransducer is fed to a zero and gain adjust circuit 67 which includes manual zero and gain controls 68 and 69 respectively. The output of the zero and gain adjust circuit $V_f$ is then fed to a control circuit 70, as is an input control signal $V_c$. A waveform generator 71 and a limiter circuit 72 are connected to a pair of terminals 73 and 74 which are in turn connected to an AC power source. The output of the waveform generator $V_w$ is fed to comparator 75. The output of the control circuit $V_c$ is fed through resistor R42 to comparator 75 where it is designated as $V_c'$. The output of the comparator $V_s$ is then fed to a switching circuit 76 which is also connected to terminal 73. Reference may be had to U.S. Pat. No. 4,093,908 issued to W. C. Evans (an applicant hereof) on June 6, 1978, for further information on the AC power control aspects of the circuitry of FIG. 10.

The output of the switching circuit $V_l$ is fed to terminal 77, and the lamps for one of the primary channels are connected between terminals 77 and 74. The output of the control circuit 70 is also connected to a limiter circuit 72 as is the positive terminal of comparator 75. For each primary color, the complete feedback control loop adjusts the respective primary component of the light output of the light source so that the feedback signal $V_f$ is equal to the input control signal $V_i$. The manual controls 68 and 69 are used to calibrate the light source so that an input signal $V_i$ in volts corresponds exactly to the negative density being compensated for by the light source. The control circuit 70 compares the feedback signal $V_f$ and the input control signal $V_i$, and generates an output signal $V_c$ which passes through resistor R42 to comparator 75 where it becomes $V_c'$. The waveform generator which is connected in parallel across the source of AC power produces a predetermined time-variant output $V_w$. Outputs $V_w$ and $V_c'$ serve as the two inputs to comparator 75 whose output $V_s$ changes state whenever the algebraic difference of the two input signals changes sign. The rapid change of the output of the comparator causes the switching circuit 76 to switch, creating signal $V_l$, as will be explained in more detail later.

The operation of comparator 75 and switching circuit 76 can best be understood by referring to FIGS. 11 and 12. Triac Q6 is a semiconductor switch which may be triggered into conduction by means of its gate terminal, and once triggered remains in its conducting state until the current through its terminals reaches nearly zero. Furthermore, IC2 is an optotriac consisting of a light-emitting diode D7 which is optically coupled to a light sensitive triac Q7 which is triggered into its conducting state whenever a sufficiently large current pulse passes through diode D7, and thereafter remains in its conducting state until the current through it drops nearly to zero. Q8 is a diac which is a semiconductor AC switch which is triggered into conduction whenever the voltage across the two terminals exceeds a pre-determined value of either polarity, and which thereafter remains in its conducting state until the current flowing through it drops nearly to zero.

FIG. 12d shows the two inputs to comparator 75. Input $V_w$ is the output of waveform generator 71 which is a time-variant signal which is synchronized to the AC line. The other input signal $V_c'$ is equal to the output of the control circuit $V_c$ through most of the operating range and becomes unequal only if limiter circuit 72 operates to limit the output lamp voltage as will be explained in more detail later. As mentioned previously, the comparator changes state whenever the algebraic difference of its two inputs changes sign, thus producing the waveform shown in FIG. 12e. Whenever the output of comparator 75 changes state, a current pulse flows through capacitor C1, its direction being determined by the direction of change of signal $V_s$. When signal $V_s$ changes in a negative-going direction, a current pulse flows through D6 and C1 while when signal $V_s$ changes in a positive-going direction, a current pulse flows through C1 and D7. Thus, a current pulse flows through diode D7 only once for each half cycle of the line as is shown in FIG. 12f. Whenever a current pulse flows through diode D7, triac Q7 is triggered into conduction, as is also diac Q8, since the voltage across its terminals exceeds the pre-determined value required for conduction. Capacitor C2 is thus discharged through diac Q8 and triac Q7, creating a current pulse into the gate of triac Q6 which triggers it into conduction. Once triac Q6 is triggered into conduction, one side of the AC line, terminal 73, is connected to the output load, terminal 77, producing the waveform shown in FIG. 12g across the lamps.

Triacs can be triggered into conduction by a very rapid change in the AC line voltage, more commonly referred to as power line spikes. Thus, random spikes which appear on the AC line can cause unwanted triggering of triacs which most often produces undesirable effects. Triacs are particularly susceptible to unwanted tirggering by power line spikes at the point where the current flowing through them is nearly zero, and they are switching from the conducting state to the non-conducting state, more commonly referred to as the commutating point. Power triacs can be constructed so that they are relatively unsusceptible to being triggered by power line spikes; however, optotriacs are particularly susceptible in this regard. With this in mind, switching circuit 76 has been designed to eliminate the unwanted triggering caused by power line spikes. Triac Q6 is of such construction that it is relatively insensitive to power line spikes, and resistor R18, capacitor C2, and diac Q8 are arranged so as to significantly reduce the effects of power line spikes on triac Q7. Resistor R18 and capacitor C2 form a filter for power line spikes. Thus, if a spike should appear across the terminals of Q6, it will be filtered by these components so that the amplitude and rate of change of the spike appearing across capacitor C7 will be significantly reduced. Diac Q8, which is relatively insensitive to a rapid change of voltage across its terminals, is placed in series with triac Q7 to further protect it at its commutation point. Since diac Q8 cannot be triggered into conduction unless the voltage across its terminals is substantial, for example 32 volts, it will act to protect triac Q7 at or near its commutating point when the instantaneous line voltage is relatively low.

Referring to FIGS. 12d–12g, it is apparent that as signal $V_c'$ is varied, the RMS voltage on the lamps is also varied. For example, as the magnitude of $V_c'$ is reduced, current spikes i occurs later in each half cycle of the AC power line, and firing angle $\theta$ also occurs later. As the firing angle $\theta$ increases, the RMS voltage applied to the lamps will decrease. Thus if the magnitude of signal $V_c'$ as shown in FIG. 12d is decreased, the RMS voltage applied to the lamps shown in FIG. 12g will also decrease. If the signal being fed from waveform generator 71 were a linear ramp such as that shown in FIG. 12c, the relationship between the feedback voltage $V_f$ and $V_c'$ would be highly nonlinear as is shown in FIG. 13.

This nonlinear gain can have deleterious effects on the feedback control loop and is counteracted according to the invention. For high light levels, the gain of the feedback control loop would be relatively low, whereas for low light levels, the gain would be relatively high. Thus, if the loop gain were set at a relatively low light level so as to provide stable operation at that point, the gain at higher light levels would be much lower which would, in turn, cause very poor transient response. In particular, the control loop would take an excessive amount of time when responding to input control signals corresponding to higher light levels. Of course, the range of adjustment of the light output would also be severely limited since the variation in gain increases as the adjustment range increases. It is therefore highly desirable to eliminate this nonlinearity so that good transient response can be achieved for all light levels. Accordingly, the time-variant, nonlinear waveform whose general shape is shown in FIG. 12d is generated in order to eliminate the aforementioned nonlinearity. In particular, the shape of waveform $V_w$ shown in FIG. 12d is exactly that which is required to produce a linear gain characteristic in the feedback loop as was previously described. This particular wave shape, of course, can be determined experimentally, and can be synthesized exactly by waveform generator 71. However, a waveform generator which produces a time-variant, anti-log function, which will be described in more detail later, is preferred since it results in circuitry which is much simpler and lower in cost.

Its operation can be most readily understood by referring to FIGS. 11 and 12. Transformer T1 is connected to the AC power source, and its secondary voltage is rectified by diodes D8 and D9, after which it is applied to a network consisting of resistors R19, R20, and zener diode D10. The resulting waveform V3 which is shown in FIG. 12a is then fed to one terminal of comparator A9. A voltage divider formed by resistors R21 and R22 is connected to a stable DC source V1 to produce a stable voltage V4 which is fed to the other terminal of comparator A9 and also to one terminal of amplifier A10. Near the zero crossing of the AC power line, V3 is less than V4, and the output of comparator A9 shown in FIG. 12b drops to zero which clamps the summing point of amplifier A10 below the level of V4 by means of diode D11. This raises the output of amplifier A10 to its maximum value as shown in FIG. 12c. At point A, the comparator output V5 goes more positive than V4 which releases the clamp on the summing point of amplifier A10. Resistor R23 and capacitor C3 in combination with amplifier A10 form an integrator which then begins to integrate in a negative-going direction as indicated in FIG. 12c.

The output of amplifier A10 is then fed to a gain-reducing and inverting stage formed by amplifier A11 in combination with R27 and R28. The positive input terminal of amplifier A11 is fed from an adjustable, temperature-dependent DC source which is formed by potentiometer R24, resistors R25 and R26, and diode D12. One end of this network is connected to a previously mentioned stable DC source V1, which is also fed to the positive terminal of amplifier A12. The other end of this network is connected to a second stable DC source V2.

The output of amplifier A11 is next fed to an amplifier stage formed by amplifier A12 in combination with diode D13 and resistor R29 which produces an output voltage which is the anti-log of its input voltage (the output of amplifier A11). This comes about because of the logarithmic relationship between the current and voltage in diode D13. The voltage fed to the positive terminal of A11 biases the output of that amplifier positively so that diode D13 is conducting even when the output of amplifier A10 is at its maximum value. Thus, when amplifier A10 is at its maximum value, the output of amplifier A12 will be at its most positive value, and the current through diode D13 will be at its minimum value. As the output of amplifier A10 decreases linearly as shown in FIG. 12c, the output of amplifier A11 increases positively causing more current to flow through D13 which makes the output of amplifier A12 go more negative in an anti-logarithmic fashion, and waveform $V_w$ shown in FIG. 12d is generated. Diode D12 is used to compensate for the ambient temperature effects of diode D13. These two diodes are located in close proximity to each other so that they both are subjected to the same ambient temperature. If, for example, the ambient temperature were to increase, then the voltage across both diodes D12 and D13 would change by approximately the same amount which would prevent the output of amplifier A12 from changing even though the ambient temperature changed. Potentiometer R24 changes the voltage at the positive terminal of amplifier A11 and therefore changes the voltage across diode D13 which in turn changes the degree of curvature of $V_w$. This therefore serves as a linearity adjustment so that the previously described nonlinear characteristic shown in FIG. 13 can be precisely linearized.

It has been found that by using the waveform generator described above, an extremely linear gain characteristic is produced for firing angles greater than approximately 80 degrees. In the preferred embodiment, lamps whose rated voltage is somewhat below the voltage of the AC power source are used. For example, if the AC power source is nominally 117 volts AC, then lamps which have a rated voltage of 82 volts are used. With this arrangement, the firing angle $\theta$ will be greater than 80 degrees even when the lamps are at their maximum rated voltage and, as a result, the system will always be operating in a region where the gain is extremely linear.

Referring again to FIG. 11, the feedback signal $V_f$ from the phototransducer is fed to a network consisting potentiometer R30, and resistors R31, R32, and R33. Resistors R32 and R33 are substantially equal, as are resistors R34 and R35. The feedback signal $V_f$ is therefore substantially divided by two by the aforementioned network before it is fed to the positive input terminal of amplifier A14 where it is amplified by substantially two, through the action of the amplifier in combination with resistors R34 and R35. A network formed by resistors R38, R37, and R36 is attached to a stable DC source V1, and forms an adjustable voltage divider. The output of this network is fed to buffer amplifier A13 whose output is fed to resistor R35. It is thus evident that potentiometer R30 forms a gain adjustment previously designated as 69, and that R37 serves as a zero adjustment previously designated as 68.

The output of amplifier A14, $V_f'$, is then fed to control circuit 70, as is input control signal $V_i$. The input control signal $V_i$ is fed to resistor R41 and capacitor C4 which are used to filter out incoming noise, and is then fed to the positive terminal of amplifier A15. Amplifier A15 in combination with resistors R39 and R40 and capacitor C5 forms a proportional plus integral controller. Thus when it's at its steady state, the feedback signal $V_f$ is equal to the input control signal $V_i$, and the output signal $V_c$ from the controller is the value which is required to generate the proper lamp voltage corresponding to $V_f$. As mentioned previously, the signals $V_c$ and $V_c'$ are equal unless the limiter 72 is operating so as to limit the lamp voltage. $V_c'$ is fed to the negative terminal of amplifier A17, and another DC signal V7, which is generated by amplifier A18 is fed to the positive terminal of amplifier A17. As long as V7 is more positive than $V_c'$, the output of amplifier of A17 will remain positive, and diode D14 will be back-biased. If $V_c'$ should tend to rise above V7, then $V_c'$ will be clamped at a value equal to V7 as a result of the clamping action of amplifier A17 and diode D14. Thus, if the input control signal $V_i$ were to increase even further, $V_c'$ would remain constant. This, in turn, would hold the firing angle $\theta$ constant, and would keep the voltage supplied to the lamps constant so long as the voltage from the AC power source did not change.

If V7 were to remain constant, the voltage applied to the lamp would vary as the line voltage varied which is undesirable. To eliminate this effect, the voltage V7 is made to vary as a function of the AC power line voltage in such a manner as to compensate for this undesirable effect. The primary winding of transformer T2 is tied to the source of AC power, terminals 73 and 74, and the secondary voltage is full-wave rectified by diodes D15 and D16 where it is then fed to a network consisting of resistors R43 and R44 and capacitor C6. This network produces a DC voltage at the positive terminal of buffer amplifier A19 which is proportional to the average value of the rectified AC voltage being fed to the input of the network, and is therefore representative of the AC power line voltage. Thus, as the AC power line voltage increases, the output of A19 will increase and vice versa. The output of amplifier A19 is then fed to amplifier A18 which in combination with resistors R45 and R46 inverts the phase of the signal and changes its gain.

Consider that amplifier A17 and diode D14 clamp the signal $V_c'$. If the power line voltage increases, tending to increase the RMS voltage on the lamps, then $V_c'$ will decrease or become more negative. This in turn will increase the firing angle $\theta$ which will tend to decrease the RMS lamp voltage. The limiter circuit 72 makes the lamp voltage substantially constant when in a limiting condition, even though the source of AC power may vary. A network formed by potentiometer R47 and resistors R48, R49, and R50 form an adjustable voltage divider. This is connected to a stable DC source V1, and the output is connected to the positive terminal of amplifier A18. For any given line voltage, V7 is therefore made to vary as a function of the setting of potentiometer R47. For any given line voltage, V7 establishes the point at which the circuit will limit, and therefore establishes the lamp voltage when the system is in a limiting condition. Thus potentiometer R47 provides a means whereby the limiting value of the lamp voltage can be adjusted.

When the system is in a limiting condition, the input control signal $V_i$ is slightly greater than the feedback signal $V_f$. Because of the integrating action of controller 70, the signal $V_c$ will therefore continue to increase such that it is more positive than $V_c'$ which at this point is equal to the V7. $V_c$ is fed to a filter formed by R51 and capacitor C7, the output of which is fed to the positive terminal of comparator A20. The other end of comparator A20 is then connected via resistor R52 to V7. Thus, whenever the loop goes into a limiting state, the output of comparator A20 goes from zero to a positive output which provides an alarm output which can be fed to external devices to indicate that the loop is in a limited state. The previously described limiters serve to protect the lamps from being over-voltaged. If the firing angle were not so limited, it would be possible to apply the full line voltage to the lamps, which would seriously limit their life. Of course without the limiters, the lamps could be over-voltaged by means of the input control signal as well. The limiters therefore serve to protect the lamps at all times. The output alarm indicates that the loop is in a limited state and that the correspondence between the input control signal and the light output is no longer valid.

As mentioned previously, the output of the waveform generator $V_w$ is also fed to the comparators of the other two channels so that a single waveform generator serves to linearize the gain of all three channels, since their uncompensated gain characteristics are substantially equal.

When a typical color negative is projected onto a typical photographic color paper, the red exposure should be substantially greater than the green exposure, which in turn should be substantially greater than the blue exposure for proper color balance. If the light source herein described is used, the voltage on the red lamps will be substantially higher than the voltage on the green and blue lamps. The voltages on the two green lamps and the one blue lamp tend to be approximately equal since the two green lamps generate twice as much light as the one blue lamp. Since more red light is required than green and blue light, the overall light output efficiency of lamphouses is generally measured by the amount of red light that can be produced at maximum voltage.

By replacing the two green filters 19 and 20 (FIG. 1) with two yellow filters, and the one blue filter 22 with a magenta filter, relatively higher red output can be obtained. The yellow filters will transmit both red and green light while the magenta filter will transmit both red and blue light. Thus if an input control signal is fed to the green channel, the feedback loop will set the amount of green light in the output to the desired value. Since the green light is being generated by yellow filters, there will also be an amount of red light generated from this channel which is approximately equal to the amount of green light. Similarly, if an input control signal is fed to the blue channel, then it will set the amount of blue output light to the desired value and the magenta filter will also introduce a comparable amount of red light in the output. Since red light is being generated by both the green and blue channels, then for a given input control signal on the red channel, the corresponding lamp voltage on the red lamps will be significantly reduced, since the photo sensor for the red channel will measure the red light which is now being generated by all three channels. Thus, the feedback for the red channel will set the red lamp voltage at that amount necessary to produce the required amount of red light in the output. When using a typical negative and typical photographic color printing material, the voltages on all five lamps tend to be very close to each other. It is evident then that through this means the intensity of the mixed light which is available for a typical negative can be significantly increased, and that the exposure times can therefore be significantly decreased, thus speeding up the production printing process. The life of an incandescent lamp varies drastically in relationship to the applied voltage. It is therefore evident that for a given light output, the mean time to failure for all five lamps in the lamphouse will also be substantially reduced, therefore substantially increasing the average bulb life.

It will be understood that variations and modifications of the herein described presently preferred embodiments of the invention can be made without departing from the spirit and scope of this invention. For instance, groups of lamps rather than single lamps could be used, with each group being positioned in a manner similar to that herein described. Also the mixing chamber 57 could be constructed with a square cross-sectional area but with sides which taper such that the bottom portion nearest the lamps has a larger cross-sectional area while the top portion nearest the negative has a smaller cross-sectional area. Such an arrangement would obviously tend to concentrate the light into a smaller area, and would be particularly useful for illuminating small negatives. Also, to change the degree of mixing, the length and cross-section of the mixing chamber could be changed, or diffusers different from those described could be used. Also, the waveforms illustrated in FIGS. 12a through 12g might be generated by a variety of different circuits. Accordingly, the foregoing description should be taken as illustrative and not in a limiting sense.

We claim:

1. A light source for photographic printers comprising means for producing light of three primary colors, a mixing chamber having input and output ends into which said light is projected and from which mixed light is emitted for photographic illumination purposes, means for sensing the emitted light from said chamber, and electronic control means for detecting said light from said sensing means and processing said light together with control signals for said printer to control the intensity of each primary color produced by said producing means, said electronic control means comprising separate channels for each of said colors, each channel having phototransducer means for providing output signals related to the log of the intensity of a different primary color of light from said sensing means, and electronic control means having means for combining said printer control signals and phototransducer output signals and comparing said signals with a repetitive signal having a pre-determined nonlinear amplitude time characteristic for controlling the electrical power to said lamps and the current produced thereby.

2. The invention according to claim 1 wherein said light-producing means produce yellow, magenta, and red light respectively and said phototransducer means separates said sensed light into red, green, and blue components, and said electronic control means provides for the control of (i) the power to said magenta light-producing means from the channel which processes said blue component, (ii) the power to said yellow light-producing means from the channel which processes said green component, and (iii) the power to said red light producing means from the channel which processes said red component.

3. The invention according to claim 1 wherein said nonlinear characteristic is a time-variant, anti-log function.

4. The invention according to claim 1 wherein said control means includes, in each channel, a switching circuit for applying current from the AC line to each of said lamps responsive to a control signal resulting from the comparison of said repetitive signal and another signal which is a pre-determined function of the summation of said printer control signal and said phototransducer means signal.

5. The invention according to claim 1 wherein said sensing means comprises a light pipe of transparent material which projects into said chamber and has an input surface inclined to the axis thereof, said surface facing the output end of said chamber.

6. The invention according to claim 5 wherein said phototransducer means includes separate photodetectors disposed outside of said chamber and responsive to light at different positions spaced around the axis of said light pipe at the end thereof opposite from the input end thereof.

7. The invention according to claim 1 wherein said phototransducer means comprises log amplifiers in each of said channels, each having an output transistor, a common substrate on which said output transistors are mounted, transistor means on said substrate responsive to the temperature of said substrate, and means including said transistor means for heating said substrate to tend to maintain temperature constant.

8. The invention according to claim 1 wherein said mixing chamber has a rectilinear cross-section and said primary light-producing means comprises means for projecting light having primary colors in the direction of different opposite diagonals of said rectilinear cross-section and for projecting the remaining primary color along the central axis of said chamber.

9. The invention according to claim 8 wherein said two primary colors are red and green and said remaining primary color is blue.

10. The invention according to claim 8 further comprising a housing, a first module containing said lamps and associated reflectors and filters, a second module containing said mixing chamber and associated diffusing means at the opposite end thereof, and an electronic module containing said phototransducer means, said modules all being separately mounted to said housing.

11. The invention according to claim 1 wherein a transparent diffusing plate is mounted across the input end of said chamber.

12. The invention according to claim 11 wherein said plate has glass micro-spheres distributed over the surface thereof.

13. The invention according to claim 11 further comprising a transparent diffusing plate across the output end of said chamber.

* * * * *